M. S. WHITMAN.
DEVICE FOR TEACHING FRACTIONAL VALUES.
APPLICATION FILED MAR. 27, 1912.
1,043,652.  Patented Nov. 5, 1912.
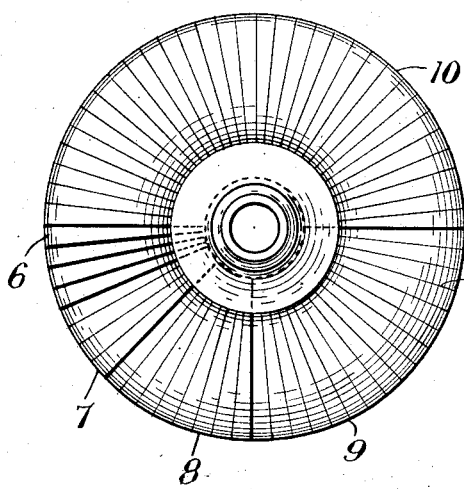
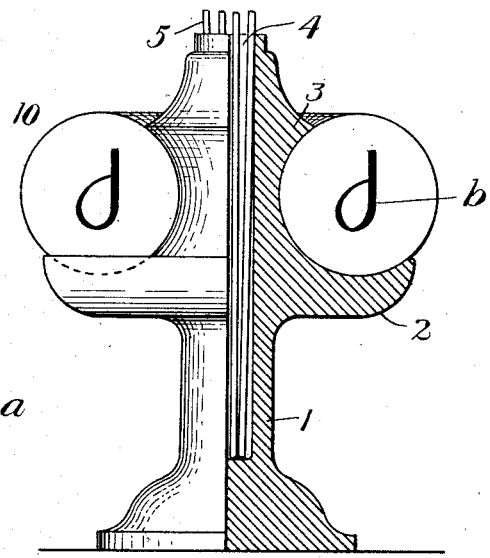
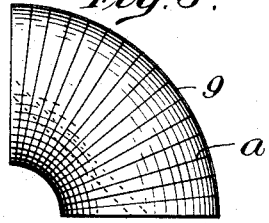
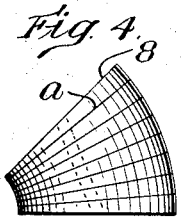
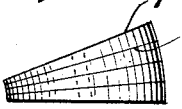
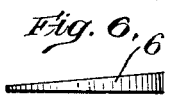
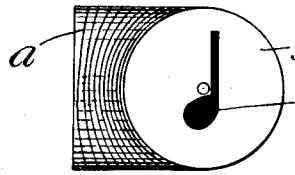
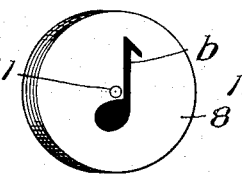
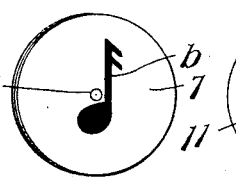
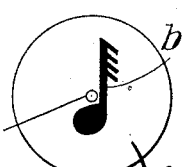
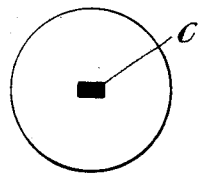
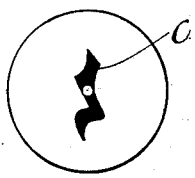
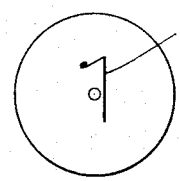
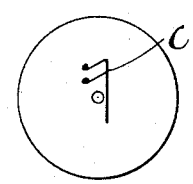
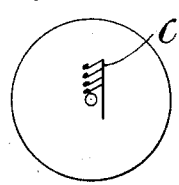
Witnesses:
Victoria Fowler
Vera E. Fogg.
Inventor:
Matilda Sophia Whitman.
by
Attorney.

UNITED STATES PATENT OFFICE.

MATILDA SOPHIA WHITMAN, OF ST. JOHN, NEW BRUNSWICK, CANADA.

DEVICE FOR TEACHING FRACTIONAL VALUES.

1,043,652.

Specification of Letters Patent. Patented Nov. 5, 1912.

Application filed March 27, 1912. Serial No. 686,497.

*To all whom it may concern:*

Be it known that I, MATILDA SOPHIA WHITMAN, a subject of His Majesty King George the Fifth, residing at St. John, Province of New Brunswick, Dominion of Canada, have invented certain new and useful Improvements in Devices for Teaching Fractional Values, of which the following is a specification.

This invention relates to an improvement in devices for teaching fractional values and particularly to an appliance for schools and kindergartens.

In teaching note values in music and the relative value of notes of different lengths and rests of different lengths, it is greatly desired to present to the mind of the pupil the various relations through some medium which shall consistently present the unitary characteristic of any particular part and the relation thereof to the particular whole. It is also desired at the same time that the device itself be so constructed as to be easily handled by the child and the parts be capable of being placed and replaced without difficulty.

It has heretofore been attempted by the use of a sphere to present these features to the mind of the child, but the devices heretofore employed have been open to various objections which I have overcome in my present invention.

The construction and use of my present invention will be set forth more fully in the specification which follows.

Throughout specification and drawings like reference numerals are employed to indicate corresponding parts and in the drawings:—

Figure 1 is a plan view of a device embodying my invention, Fig. 2 is a side view partly in section, showing the same, Figs. 3, 4, 5 and 6 are plan views of the segments representing respectively the values of a quarter, eighth, sixteenth and sixty-fourth, Figs. 7 to 10, inclusive, are side views of the elements shown in Figs. 3 to 6, respectively, and Figs. 11 to 15 respectively show the face symbols of the elements used to teach rests, Figs. 16 and 17 are central sections of units representing sixty-fourths showing raised and depressed figures on the face thereof.

I provide preferably a support comprising a base 1 having an over-hanging shoulder 2 between which and the second shoulder 3 is a deep annular groove adapted to receive and support in assembled positions a plurality of segments in the shape of a ring. The standard 1 is formed with a central recess or socket, in which rods 5 may be kept for the purposes hereinafter described.

The ring above referred to is composed of a plurality of segments 6, 7, 8, 9 and 10, cut radially and of varying lengths. I preferably provide each ring with divisions as follows: One segment 10 comprising a half; one segment 9 a quarter; one segment 8 an eighth; one as 7 a sixteenth; and four, each a sixty-fourth of the entire diameter of the ring, as indicated at 6. Each section, except the sixty-fourth, is marked off into sixty-fourths by any suitable lines, grooves, or other demarcation, as indicated at $a$. I preferably provide two such rings to constitute a set for teaching note values. These rings are preferably distinguished by color, roughness, weight, or any other means, so that either the seeing or the blind child may be able to distinguish them. On each face of each member of the ring I place the indicated note values of the section, as shown at $b$. In Fig. 7 I have indicated a quarter note on the quarter section, in Fig. 8 an eighth note on the eighth section, and in Figs. 9 and 10 a sixteenth and a thirty-second note respectively. In Figs. 11 to 15 I have indicated at $c$ half, quarter, eighth, sixteenth and sixty-fourth rests.

In the case of devices adapted for the blind I preferably form the notes or rests in raised or depressed characters, as shown at $d$ and $e$ in Figs. 16 and 17 respectively. I perforate the smaller segments, as indicated by Figs. 3 to 15, inclusive, by making an opening therethrough so that the segments may be strung on the rod 5 for the purpose of building up segments of greater size with those of smaller size to show the addition of fractional note or rest values. In this stringing the notes are simply slipped on over the end of the rod and are held in the fingers. I have illustrated in Figs. 3 to 6, inclusive, the openings by dotted lines, it being shown as a straight passage through the segments. This stringing permits the child to handle built up segments as segments of greater note or rest value so that by the sense of touch as well as by the sense of sight the child learns the relation of fractions of different denomination. The rods 5 are made of flexible wire so that the segments may be strung on and brought into alinement with each other.

In teaching the child the values of the notes, the attention is first attracted to the ring in its entity as representing a single whole note or rest as the case may be. The child is then shown that the entire note or rest is made up of parts and it is directed to remove and replace the several parts until familiar with the relation of the parts to the whole.

Each part which corresponds to a fractional note has on its end view a circular appearance indicating that the note itself is a complete unit, while the thickness of the segments indicates the relation of any individual note to a whole note as a basis. The different fractional notes are then strung together showing the result of the combination of the fractional elements and a comparison of them with other undivided fractional elements of the same size.

I find that my stand as shown is effective in supporting the several fractions securely while displaying effectively the section ends.

Various modifications may obviously be made in the detail and construction of my device and in the methods and procedure in the use, all without departing from the spirit of my invention if within the limits of the appended claims.

What I, therefore, claim and desire to secure by Letters Patent is:—

1. A device for teaching fractional values comprising a stand having an annular supporting groove thereabout and having a central vertical recess therein, a ring substantially circular in radial cross section fitting said groove, said ring being marked off into unit segments and being radially divided into segments of different lenghts each presenting substantially circular end faces.

2. A device for teaching fractional values comprising a stand having an annular supporting groove thereabout, a ring fitting said groove, said ring being marked off into unit segments and being radially divided into suitable segments of different lengths and each presenting substantially circular end faces.

3. A device for teaching fractional values comprising a stand having an annular supporting groove thereabout and having a central vertical recess therein, a ring substantially circular in radial cross section fitting said groove, said ring being marked off into unit segments and comprising a plurality of segments of different lengths presenting substantially circular end faces and having an opening therethrough and a rod adapted to be retained in said central vertical recess on which said segments may be strung by means of said openings.

In testimony whereof I affix my signature in presence of two witnesses.

MATILDA SOPHIA WHITMAN.

Witnesses:
EMILY ELIZABETH McKINNON,
BERTHA ELIZABETH McADOO.

---

Copies of this patent may be obtained for five cents each, by addressing the "Commissioner of Patents, Washington, D. C."